No. 853,670. PATENTED MAY 14, 1907.
G. YANACOPOULO.
LIQUID MEASURING PUMP.
APPLICATION FILED SEPT. 8, 1906.
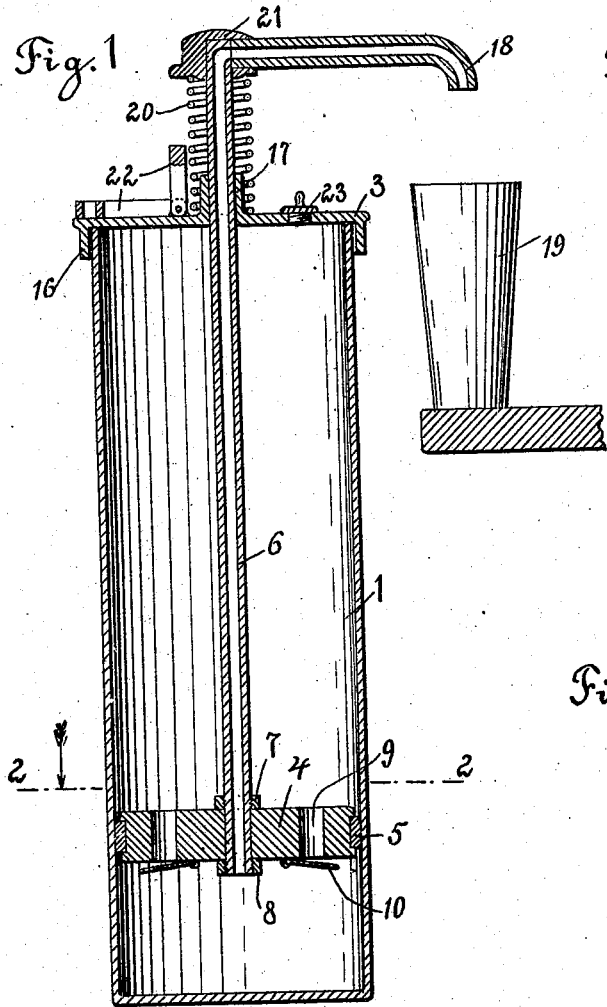
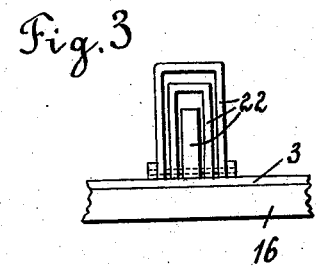
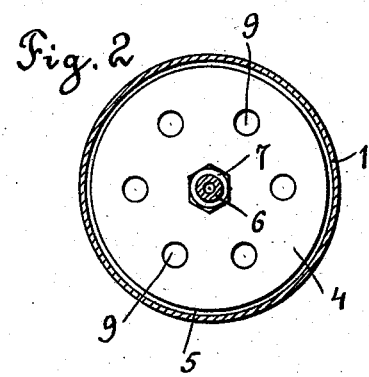
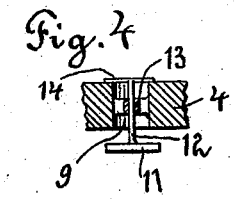
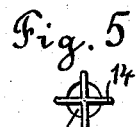
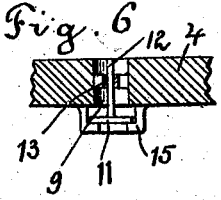
WITNESSES
INVENTOR
George Yanacopoulo
BY
Sigmund Herzog
his ATTORNEY

UNITED STATES PATENT OFFICE.

GEORGE YANACOPOULO, OF NEW YORK, N. Y.

LIQUID-MEASURING PUMP.

No. 853,670.   Specification of Letters Patent.   Patented May 14, 1907.

Application filed September 8, 1906. Serial No. 333,838.

*To all whom it may concern:*

Be it known that I, GEORGE YANACOPOULO, a citizen of the United States of America, and resident of the city of New York, in the county of New York and State of New York, have invented certain new and useful Improvements in Liquid - Measuring Pumps, of which the following is a specification.

Measuring pumps for liquids consisting of a cylinder in which a piston, by depressing the same a predetermined distance, causes the decanting of a desired amount of liquid, are old in the art. The piston, provided with ports for connecting the storing part of the cylinder with the measuring chamber, is normally held in position, separating a quantity of liquid, larger than the largest quantity of liquid to be dispensed. The piston rod, in apparatus of this character, is slidingly connected to the piston proper and provided with a flange or other means, acting as a valve body, to close the ports in the piston, forming the valve seat, before the piston is sufficiently depressed to discharge the liquid. This construction and the further fact that an apparatus of this character, as a rule, requires a separate discharge pipe, makes the apparatus rather complicated and, therefore, expensive, while, at the same time, the valves in the piston, separating the measuring chamber from the storing chamber in this class of devices, are mechanically defective.

The object of the present invention, therefore, is to provide a simplified measuring pump, obviating the defects heretofore mentioned, by rigidly connecting the piston rod to the piston and having valves in the piston of most simple and efficient construction, and using the piston rod as a duct for decanting the liquid. A series of stops are provided for regulating the quantity of liquid which it is desired to discharge.

The accompanying drawings, forming part of the present application for Letters Patent, illustrate in Figure 1 a vertical cross sectional view of a pump, built according to the present invention; Fig. 2 is a horizontal cross section in the line 2—2 of Fig. 1; Fig. 3 is an elevation of the devices for predetermining the quantity of liquid, and Figs. 4, 5 and 6 are details of modified forms of the valves in the piston.

1 in Fig. 1 is a cylindrical receptacle, permanently closed at one end and at the other end provided with a removable cover 3. A piston 4 is movable in the cylinder 1 and has a packing ring 5 to insure a perfect separation of the portions of the cylinder on each side of the piston. The piston rod 6 is made of a hollow tube, secured to the piston by means of nuts 7 and 8, or other suitable devices. The piston has furthermore a series of valve ports 9 and a corresponding number of valve bodies 10. In the pump, illustrated in Figs. 1 and 2, the valve is shown in the form of a lid, the piston itself forming the valve seat, the valves 10 are on the side of the measuring chamber of the cylinder, and close, of course, when the piston is depressed, while they open when the piston is raised.

Figs. 4, 5 and 6 illustrate modified forms of valves, and, in particular, Figs. 4 and 5, a valve comprising a valve body 11 and a valve stem 12, which latter passes through a stem bearing 13, while the movement of the valve is preferably limited by means of a stop cross 14.

In Fig. 6 the valve proper is of similar construction to that shown in Figs. 4 and 5, but the valve motion is limited by means of a bracket 15, on the side of the valve body.

The cover 3 of the cylinder 1 shows a flange 16, surrounding the upper rim of the cylinder to which it may be secured, if desired, in any suitable manner. The piston rod 6 passes through the hub portion 17 of the cover and ends in a discharge pipe 18, under the outlet of which the glass or other container 19 for dispensing the liquid may be placed. A helical spring 20 surrounds the upper end of the piston rod 6, between the cover 3 and the pressure knob 21 at the upper end of the piston rod, and holds the piston in its uppermost, that is in its normal position. A series of pivoted stops 22 adjoin the upper end of the piston rod and limit the degree of the depression of the piston.

In using the apparatus, the screw plug 23, closing the inlet to the cylinder, is removed and the cylinder filled with the liquid, which will pass through the ports of the piston into the measuring chamber until the latter is entirely filled, and the rest of the liquid remains in the storing chamber of the cylinder. One of the stops 22, determining a certain quantity of liquid, is now placed in an upright position and by depressing the knob 21, a certain quantity of liquid passes through the hollow piston rod and the discharge pipe into the dispensing container until the down movement of the piston is limited by the striking of the knob against the stop, whereupon it returns to normal position through the operation of the spring 20. It is understood that during the downward movement, the valves of the piston will seat themselves and close the ports, while during the return stroke they will open again and allow the liquid to pass from the storing chamber into the measuring chamber.

As new and useful is claimed and desired to be secured by Letters Patent of the United States:—

A measuring pump, comprising a container forming a storing chamber and a measuring chamber, a piston adapted to slide in said container and separating the storing chamber from the measuring chamber, a hollow piston rod rigidly connected to said piston, a faucet communicating with said hollow piston rod and, in turn, with said measuring chamber, one or more valves in said piston adapted to be closed on the downward stroke of the piston in the direction of the measuring chamber and to be opened on the stroke in the direction of the storing chamber, a cover on said container through which said piston rod extends, an inlet in said cover, a series of exchangeable stops on said cover to determine the extent of the operating stroke of the piston, and means for causing the piston to return to its normal position.

Signed at New York, in the county of New York and State of New York this second day of August A. D. 1906.

GEORGE YANACOPOULO.

Witnesses:
ALEXANDER MANZAVINOA,
SIGMUND HERZOG.